United States Patent [19]

Gaul

[11] 4,395,460
[45] Jul. 26, 1983

[54] PREPARATION OF POLYSILAZANE POLYMERS AND THE POLYMERS THEREFROM

[75] Inventor: John H. Gaul, Midland, Mich.

[73] Assignee: Dow Corning Corporation, Midland, Mich.

[21] Appl. No.: 304,446

[22] Filed: Sep. 21, 1981

[51] Int. Cl.³ .................. B05D 3/02; C04B 35/52; B32B 9/00; C09K 3/00
[52] U.S. Cl. .................. 428/408; 106/287.11; 106/287.13; 106/287.14; 264/29.2; 264/29.5; 264/29.6; 423/345; 427/228; 501/88; 501/90; 501/91; 501/92; 528/21; 528/36; 556/430; 556/468; 556/484; 428/447
[58] Field of Search .................. 106/287.16, 287.11, 106/287.13, 287.14; 528/36, 21; 501/91, 92, 90, 88; 423/345; 556/485, 430, 468, 484; 428/408, 447, 698; 427/228; 264/29.2, 29.5, 29.6

[56] References Cited

U.S. PATENT DOCUMENTS

| | | | |
|---|---|---|---|
| 2,842,580 | 7/1958 | Gilbert | 528/10 |
| 3,853,567 | 12/1974 | Verbeek | 501/92 |
| 3,892,583 | 7/1975 | Winter et al. | 501/92 |
| 4,097,294 | 6/1978 | Rice et al. | 501/92 |
| 4,164,528 | 8/1979 | Yajima et al. | 501/92 |
| 4,310,482 | 1/1982 | Baney | 423/345 |
| 4,310,651 | 1/1982 | Baney et al. | 528/21 |
| 4,312,970 | 1/1982 | Gaul | 526/279 |
| 4,314,956 | 2/1982 | Baney et al. | 423/345 |
| 4,340,619 | 7/1982 | Gaul | 428/408 |

*Primary Examiner*—Theodore Morris
*Attorney, Agent, or Firm*—Richard A. Kaba

[57] ABSTRACT

What is disclosed is a process for preparing polysilazane polymers by contacting and reacting chlorine-containing disilanes with ammonia. The polysilazane polymers are useful as chemical intermediates to produce silicon-containing chemical compounds. They are also useful in the formation of silicon carbide-containing ceramic materials.

31 Claims, No Drawings

PREPARATION OF POLYSILAZANE POLYMERS AND THE POLYMERS THEREFROM

BACKGROUND OF THE INVENTION

This invention relates to the preparation of polysilazane polymers. These polymers are useful as chemical intermediates to synthesize organosilicon compounds. They are also useful, when fired at high temperatures, to form silicon carbide and silicon carbide containing ceramic materials.

What is disclosed herein is a novel process to obtain novel polysilazane polymers which consists of contacting and reacting chlorine-containing disilanes with ammonia in an inert, essentially anhydrous atmosphere.

As is well known in the art, halosilane monomers will react with ammonia and most organic compounds containing a primary or secondary amino group to give a variety of silazanes. For example, the reaction of trimethylchlorosilane and ammonia produces hexamethyldisilazane, a silazane monomer, while dimethyldichlorosilane and ammonia produce dimethylcyclic silazanes. These two reactions probably constitute the majority of commercial uses of the silazane chemistry.

Silazanes in general have been academic curiosities for many years and a variety of such silazanes, including monomers, oligomers, cyclics and even low molecular weight resins and linear polymers have been prepared by a variety of methods. For example, L. W. Breed et al, in the Journal of Organic Chemistry, 27, 1114(1962) report the formation of silazanes from the polymerization of sterically hindered silazane oligomers, while in the Journal of Polymer Science, A 2,45(1964), cyclic trimer and tetramer silazanes are reported to be thermally cracked using catalysts to give linear polymers.

In contrast, fluids, rubbery polymers and resins prepared from $CH_3SiCl_3$, $(CH_3)_2SiCl_2$ and excess ammonia have been reported by Kruger et al. in the Journal of Polymer Science, A 2,3179(1964) and Redl, Silazane Polymer, ARPA-19, Advanced Research Projects Agency, October, 1965.

The patent literature also contains disclosures of the preparation of silazanes. Cheronis, in U.S. Pat. No. 2,564,674 discloses the preparation of low molecular weight linear silazane polymers by the reaction of halosilanes with excess ammonia in a solvent solution. Bausma, et al., in U.S. Pat. No. 3,809,713 discloses a similar reaction scheme with the added modification of removing the by-produced solid ammonium halide using ethylene diamine. More recently, Verbeek, et al., in U.S. Pat. Nos. 3,853,567 and 3,892,583 disclosed that mixtures of $CH_3SiCl_3$ and $(CH_3)_2SiCl_2$ can be treated with ammonia or organoamines to form materials that can be pyrolyzed to yield $SiC/Si_3N_4$ ceramics.

As should be recognized by those skilled in the art, the present invention differs in at least one respect from all of the above art in that the present invention is based on chlorine-containing disilanes as opposed to the use of chlorine-containing monosilanes.

In another segment of the prior art, the use of disilanes in the preparation of silazane polymers has been limited to the formation of relatively low molecular weight materials. In one example, Wannagat et al., Ang. Chem. 75(7) 345(1963), reported the reaction of tetramethyldichlorodisilane with gaseous ammonia to give a six-membered cyclic silazane, $[(CH_3)_2SiSi(CH_3)_2NH]_2$, rather than the expected linear silazane polymer and Hengge et al., Montach, Chem. 101(92)325(1970), prepared dimethylamino substituted mixtures of disilanes from dimethylamine and the chlorine-containing disilane mixture obtained from the Direct Process for the preparation of chlorosilanes.

What has been newly discovered is the coreaction between chlorine-containing disilanes and ammonia to give high molecular weight silazane polymers.

THE INVENTION

The instant invention concerns a new class of silazane polymers prepared from chlorodisilanes. In essence, a single chlorine-containing disilane or a specified mixture of chlorine-containing disilanes is treated with ammonia, as the nitrogen source, in sufficient amounts to react with all of the chlorine on the chlorine-containing disilanes. This is usually an excess amount of ammonia based on the chlorine content of the disilane. When the mixture is heated in an essentially anhydrous atmosphere at elevated temperature, the reactions take place.

The advantage of this process is the ability to stop the reaction at any point by cooling the reaction mass thus resulting in polymers with any desirable viscosity, hence any desirable molecular weight. The silazane polymers range in physical appearance from liquids, to high viscosity liquids, to hard glassy materials. The materials are therefore very easy to handle. They are essentially hydrolytically stable.

Thus, this invention consists of a process for preparing polysilazane polymers which consists of contacting and reacting in an inert, essentially anhydrous, atmosphere at a temperature in the range of 25° C. to 370° C.

(A) ammonia and (B) chlorine-containing disilanes selected from the group consisting of (i) a chlorine-containing disilane having the general formula $$[Cl_a R_b Si]_2$$

and (ii) a mixture of chlorine-containing disilanes having the general formula $$[Cl_c R_d Si]_2$$

wherein a has a value of 1.5–2.0;

b has a value of 1.0–1.5;

the ratio of c to d is in the range of 1:1 to 2:1;

the sum of a+b is equal to three;

the sum of c+d is equal to three; and

R in each case is selected from a group consisting of the vinyl group, an alkyl radical of 1–3 carbon atoms and the phenyl group.

This invention also deals with a new and novel composition of matter which is a polysilazane polymer which is prepared by contacting and reacting in an inert, essentially anhydrous, atmosphere at a temperature in the range of 25° C. to 370° C.

(A) ammonia and (B) chlorine-containing disilanes selected from the group consisting of (i) a chlorine-containing disilane having the general formula $$[Cl_a R_b Si]_2$$

and (ii) a mixture of chlorine-containing disilanes having the general formula $$[Cl_cR_dSi]_2$$

wherein
a has a value of 1.5–2.0;
b has a value of 1.0–1.5;
the ratio of c to d is in the range of 1:1 to 2:1,
the sum of a+b is equal to three;
the sum of c+d is equal to three; and
R in each case is selected from a group consisting of the vinyl group, an alkyl radical of 1–3 carbon atoms and the phenyl group.

Further, this invention deals with a method of preparing a silicon carbide containing ceramic material which consists of heating a polysilazane polymer in an inert atmosphere or in a vacuum to at least a temperature of 750° C. until the polysilazane polymer is converted to silicon carbide ceramic material, which polysilazane polymer is obtained by a process which consists of contacting and reacting in an inert, essentially anhydrous, atmosphere at a temperature in the range of 25° C. to 370° C.

(A) ammonia and
(B) chlorine-containing disilanes selected from the group consisting of
  (i) a chlorine-containing disilane having the general formula $$[Cl_aR_bSi]_2$$

and
  (ii) a mixture of chlorine-containing disilanes having the general formula $$[Cl_cR_dSi]_2$$

wherein
a has a value of 1.5–2.0;
b has a value of 1.0–1.5;
the ratio of c to d is in the range of 1:1 to 2:1
the sum of a+b is equal to three;
the sum of c+d is equal to three; and
R in each case is selected from a group consisting of the vinyl group, an alkyl radical of 1–3 carbon atoms and the phenyl group.

Still another object of this invention is a method of preparing a silicon carbide containing ceramic article which consists of (A) forming an article of the desired shape from a polysilazane polymer; (B) heating the article formed in (A) in an inert atmosphere or in a vacuum to an elevated temperature of at least 750° C. until the polysilazane polymer is converted to silicon carbide containing ceramic, which polysilazane polymer is obtained by a process which consists of contacting and reacting in an inert, essentially anhydrous, atmosphere at a temperature in the range of 25° C. to 370° C., (A) ammonia and
(B) chlorine-containing disilanes selected from the group consisting of
  (i) a chlorine-containing disilane having the general formula $$[Cl_aR_bSi]_2$$

and
  (ii) a mixture of chlorine-containing disilanes having the general formula $$[Cl_cR_dSi]_2$$

wherein
a has a value of 1.5–2.0;
b has a value of 1.0–1.5;
the ratio of c to d is in the range of 1:1 to 2:1
the sum of a+b is equal to three;
the sum of c+d is equal to three; and
R in each case is selected from a group consisting of the vinyl group, an alkyl radical of 1–3 carbon atoms and the phenyl group.

Still another object of this invention is a method for preparing a filled ceramic article which consists of (A) mixing a polysilazane polymer with at least one conventional ceramic filler, (B) forming an article of the desired shape from the mixture of polysilazane polymer and filler and (C) heating the article formed in (B) in an inert atmosphere or in a vacuum to an elevated temperature of at least 750° C. until the polysilazane polymer is converted to a silicon carbide containing ceramic, which polysilazane polymer is obtained by a process which consists of contacting and reacting in an inert, essentially anhydrous, atmosphere at a temperature in the range of 25° C. to 370° C., (A) ammonia and
(B) chlorine-containing disilanes selected from the group consisting of
  (i) a chlorine-containing disilane having the general formula $$[Cl_aR_bSi]_2$$

and
  (ii) a mixture of chlorine-containing disilanes having the general formula $$[Cl_cR_dSi]_2$$

wherein
a has a value of 1.5–2.0;
b has a value of 1.0–1.5;
the ratio of c to d is in the range of 1:1 to 2:1
the sum of a+b is equal to three;
the sum of c+d is equal to three; and
R in each case is selected from a group consisting of the vinyl group, an alkyl radical of 1–3 carbon atoms and the phenyl group.

Still further, it is an object of this invention to prepare an article coated with a silicon carbide ceramic material which method consists of (A) mixing a polysilazane polymer with at least one conventional ceramic filler, (B) coating a substrate with the mixture of polysilazane polymer and filler and, (C) heating the coated substrate in an inert atmosphere or in a vacuum to an elevated temperature of at least 750° C. until the coating is converted to a silicon carbide ceramic material, whereby a silicon carbide containing ceramic coated article is obtained, which polysilazane polymer is obtained by a process which consists of contacting and reacting in an inert, essentially anhydrous, atmosphere at a temperature in the range of 25° C. to 370° C.

(A) ammonia and
(B) chlorine-containing disilanes selected from the group consisting of (i) a chlorine-containing disilane having the general formula

[Cl$_a$R$_b$Si]$_2$ and (ii) a mixture of chlorine-containing disilanes having the general formula

[Cl$_c$R$_d$Si]$_2$ wherein
a has a value of 1.5–2.0;
b has a value of 1.0–1.5;
the ratio of c to d is in the range of 1:1 to 2:1
the sum of a+b is equal to three;
the sum of c+d is equal to three; and
R in each case is selected from a group consisting of the vinyl group, an alkyl radical of 1–3 carbon atoms and the phenyl group.

A further object of this invention is a process for preparing an article coated with a silicon carbide ceramic material which consists of (A) coating a substrate with a polysilazane polymer, (B) heating the coated substrate in an inert atmosphere or in a vacuum to an elevated temperature of at least 750° C. until the coating is converted to a silicon carbide ceramic material, whereby a silicon carbide containing ceramic coated article is obtained, which polysilazane polymer is obtained by a process which consists of contacting and reacting in an inert, essentially anhydrous, atmosphere at a temperature in the range of 25° C. to 370° C.

(A) ammonia and
(B) chlorine-containing disilanes selected from the group consisting of
(i) a chlorine-containing disilane having the general formula

[Cl$_a$R$_b$Si]$_2$ and (ii) a mixture of chlorine-containing disilanes having the general formula

[Cl$_c$R$_d$Si]$_2$ wherein
a had a value of 1.5–2.0;
b has a value of 1.0–1.5;
the ratio of c to d is in the range of 1:1 to 2:1
the sum of a+b is equal to three;
the sum of c+d is equal to three; and
R in each case is selected from a group consisting of the vinyl group, an alkyl radical of 1–3 carbon atoms and the phenyl group.

The invention described herein result in new compositions of matter which are an improvement in the art, in that, essentially hydrolytically stable, easy to handle polysilazane polymers can be prepared. Further, the polysilazane polymers lead to an improvement in the art of formation of silicon carbide and they can be used as binders in ceramic materials.

The invention results from reacting ammonia with chlorine-containing disilanes, mixtures of disilanes or mixture of disilanes with monosilanes in an inert, essentially anhydrous atmosphere and then firing the resulting polysilazane polymer to get silicon carbide or silicon carbide containing ceramic materials.

The chlorine-containing disilanes of this invention are those disilanes having the general formulae (Cl$_a$R$_b$Si)$_2$    (i)

and (Cl$_c$R$_d$Si)$_2$.   (ii)

In these formulae, R is vinyl, an alkyl radical containing 1–3 carbon atoms or the phenyl group. Thus, those groups which are contemplated as being useful in this invention are methyl, ethyl, propyl, vinyl and phenyl. For purposes of this invention, the R groups can all be the same or they can be different. The chlorine-containing disilanes can be those found in the residue from the Direct Process for producing halosilanes (Eaborn, C., "Organosilicon Compounds," Butterworth Scientific Publications, London, 1960, pg. 1).

It is contemplated in this invention that single chlorine-containing disilanes can be used in this invention. Such silanes having the formula (i) above require that the values of a and b are from 1.5–2.0 and 1.0–1.5 respectively and the sum of a+b is equal to three. Examples of chlorine-containing disilanes useful in this invention are (Cl$_2$C$_6$H$_5$Si)$_2$, (Cl$_2$CH$_3$Si)$_2$, (Cl$_2$C$_2$H$_5$Si)$_2$, (Cl$_2$CH$_2$=CHSi)$_2$ and (CH$_3$)$_2$ClSiSiCl$_2$CH$_3$.

Also contemplated within the scope of this invention are mixtures of chlorine-containing disilanes. When mixtures of disilanes are used in this invention, such disilanes have the formula (ii) above, wherein the ratio of c to d is in the range of 1:1 to 2:1 and the sum of c+d is three. Examples of such chlorine-containing disilanes are those set forth above and in addition such disilanes as (Cl$_3$Si)$_2$, (CH$_3$)$_3$SiSi(CH$_3$)$_2$Cl, [(CH$_3$)$_2$ClSi]$_2$, [(C$_6$H$_5$)(CH$_3$)ClSi]$_2$ and [(CH$_2$=CH)CH$_3$ClSi]$_2$.

One last object of this invention is a process for preparing a polysilazane polymer which consists of contacting and reacting in an inert, essentially anhydrous atmosphere at a temperature in the range of 25° C. to 370° C., (A) ammonia and
(B) a mixture of chlorine-containing disilanes and monosilanes selected from the group consisting essentially of
(i) a mixture of a chlorine-containing disilane and a monosilane,
(ii) a mixture of a chlorine-containing disilane and a mixture of monosilanes and
(iii) a mixture of chlorine-containing disilanes mixed with a mixture of monosilanes, wherein the chlorine-containing disilanes have the general formula (Cl$_a$R$_b$Si)$_2$ and
wherein the monosilanes in each case have the general formula R$'_n$SiCl$_{4-n}$, wherein R is a vinyl group, an alkyl radical of 1–3 carbon atoms or the phenyl group; R' is vinyl, hydrogen, an alkyl group of 1–3 carbon atoms or the phenyl group; a has a value of 1.5–2.0; b has a value of 1.0–1.5; the sum of a+b is equal to three and n has a value of 0, 1, or 3.

Monosilanes useful in admixture with the disilanes of this invention can be for example $CH_3SiCl_3$, $H(CH_3)_2SiCl$, $(CH_3)_3SiCl$, $(CH_2=CH)(CH_3)_2SiCl$, $C_6H_5SiCl_3$, and $(C_6H_5)_3SiCl$.

Whenever chlorine-containing disilane mixtures are required, the number of units of diorgano-substituted silicon atoms should not exceed the number of units of monoorgano-substituted silicon atoms. Even though polysilazane polymers can be formed from chlorine-containing disilane mixtures wherein the number of diorgano-substituted units does exceed the number of monoorgano-substituted units, it has been found that these polymers do not have the handling properties for formability because of low viscosities.

The other reactant in this invention is ammonia and because of the anhydrous nature of the process herein, it is required that the ammonia used herein be essentially anhydrous.

These reactants are brought together in an inert, essentially anhydrous atmosphere. For purposes of this invention what we mean by "inert" is that the reaction is carried out under a blanket of inert gas, such as, argon or nitrogen or helium. What we mean by "essentially anhydrous" is that the reaction is preferably carried out in an absolutely anhydrous atmosphere but minute amounts of moisture can be tolerated.

The inventor believes that when the reactants are contacted with each other, the reaction begins which forms a transient intermediate disilane amino compound and $NH_4Cl$, i.e.

—Si—Si—Cl+$NH_3$→—Si—Si—$NH_2$+$NH_4Cl$

The order of addition of the materials does not appear to be critical.

The initial reaction is manifested by the appearance of the white flocculent precipitated $NH_4Cl$. $NH_4Cl$ tends to increase the viscosity of the reaction mass and therefore, it is desirable to add a low boiling solvent to disperse the $NH_4Cl$ and allow more uniform stirring of the reaction mixture. The low boiling solvent should be any dry organic solvent boiling below about 100° C. such as pentane, heptane, hexane, benzene and the like. The reaction begins when the ingredients are contacted. The reaction can be carried out at room temperature but in order to hasten the reaction, however, it is best to heat the reaction mass to a gentle reflux. Occasionally, depending on the ingredients being used, it may be necessary to stop the reaction and filter the $NH_4Cl$ from the reaction mixture. This is especially true if no solvent is used. Occasionally, the reaction mixture may need to be filtered more than once to obtain a clear filtrate. Also, one may desire to filter the reaction mixture, heat the filtrate for a continuation of the reaction and then, refilter to obtain a clear filtrate. This interim stage of the reaction scheme results in low molecular weight materials. The reaction is continued until equilibrium is reached. Equilibrium is established when no more $NH_4Cl$ is formed on continued heating. The material is then filtered and the filtrate is returned to the reaction vessel and heated to reflux, if desired, for an additional period of time. The solvent is removed by distillation and the residue is then heated to higher temperatures to form the polymeric product.

As the temperature is raised higher, more condensation takes place and crosslinking occurs. When the reaction is cooled, the condensation and crosslinking slow down or cease. This control allows one to stop the reaction at any point to obtain almost any desired viscosity. The desirable temperature range of this reaction is 25° C. to 370° C. The most preferred range is 125° C. to 300° C. The length of time that the reaction requires depends on the temperature and the viscosity one wishes to achieve.

Distillable products can be removed by heating and/or the application of vacuum.

The silazane polymers are then essentially ready to use. The silazane polymers are pyrolyzed in an inert atmosphere or in a vacuum at temperatures of at least 750° C. to give a silicon carbide containing material. If the polymer is of sufficient viscosity, it can be shaped first (such as an extruded fiber) and then pyrolyzed to give a silicon carbide containing fiber or the silazane polymers can be filled with ceramic type fillers (if desired) and then fired to at least 750° C. to obtain silicon carbide ceramic materials or silicon carbide ceramic material containing ceramic articles.

When mixtures of chlorine-containing disilanes are to be used, it is best if the chlorine-containing disilanes are mixed prior to contacting and reacting with the ammonia.

As mentioned above, some of the resulting polymers can be extruded to give various shapes such as fibers. It has been found that the polymers of this invention that have the handleability that enables one to extrude or form them are those polymers in which the number of diorgano-substituted silicon atoms do not exceed the number of monoorgano-substituted silicon atoms. Thus, if the polymer is to be extruded or otherwise formed, it should be prepared from disilanes and ammonia wherein the diorgano-substituted silicon atoms do not exceed the number of monoorgano-substituted silicon atoms.

As mentioned above, the polymers of this invention can be used in both the filled and unfilled state, depending on the application. Thus, it is contemplated within the scope of this invention to coat substrates with filled and unfilled polymers and heat the substrates to produce silicon carbide containing ceramic coated articles. Fillers and adjuvants can be milled on 3 roll mills by simply mixing the polymers of this invention with the fillers and making several passes on the mill. In the alternative, the polymers can be placed in solvents and the fillers and adjuvants can be added thereto and after mixing, the solvent can be removed to give the filled polymer.

The coating can be carried out by conventional means. The means used depends on the polymer and substrates used and the application one has in mind. Thus, these materials can be brushed, rolled, dipped or sprayed. In the filled state, it is sometimes necessary to trowel the polymer onto the substrate.

Whenever the polymers are converted to the ceramic state, it is done by pyrolyzing the polymer to a temperature of at least 750° C. in an inert atmosphere or in a vacuum.

Attempts to pyrolyze at or above 750° C. without an inert atmosphere lead to undesirable side reactions and therefore, caution should be exercised to be sure to exclude moisture and other potential reactants.

Now so that those skilled in the art can better appreciate and understand the invention, the following examples are given. The examples are for purposes of illustration only and are not to be regarded as limitations.

In the following examples, the analytical methods used were as follows:

Thermogravimetric analysis (TGA) was carried out on a Netzsch STA 429 (2400° C.) TGA instrument manufactured by Netzsch Instruments, Selb, West Germany. Sample sizes averaged 11 mg., program rate was 10° C./min., gas flow rate was 200 cc/min. The scale setting was 50° C./in.±0.5° C./in.

Percent Silicon was determined by a fusion technique which consisted of converting the silicon material to soluble forms of silicon and then the soluble material is quantitatively determined as total silicon by atomic absorption spectrometry. Solubilization takes place by weighing the sample into a Parr-type fusion cup (about 0.3 gm), adding 15.0 gms of Na peroxide, heating for about 90 sec. and quenching in cold water. The material is placed in a nickel beaker containing 150-200 ml. of distilled water. 55 ml. of reagent grade acetic acid is added and diluted with water to 500 ml. volume.

Percent Chlorine (residual) was determined by Na peroxide decomposition and titration with silver nitrate. Fusion of the halides with Na peroxide is followed by potentiometric titration with standard silver nitrate by weighing a sample into a gelation capsule, placing about 1.5 gm. of $Na_2O_2$, about 0.7 gm of $KNO_3$ and about 0.15 gm of sugar into a clean, dry section cup and burying the capsule in the mixture. The cup is filled with $Na_2O_2$ and placed in a reaction vessel. It is heated for 1-1½ min. and quenched in cold water. The cup and vessel are washed and the washings are collected. The washings are heated to dissolve any solids. 15 ml. of cold 50% aqueous $H_2SO_4$ is added to the washings and allowed to stand 15-20 sec. This solution is neutralized with additional $H_2SO_4$ and titrated.

Carbon and hydrogen were determined by microcombustion by weighing 10 to 20 mg. of sample into a micro platinum boat and treating it in an A. H. Thomas combustion apparatus, Catalog No. 6447-E, Philadelphia, PA.

Unless otherwise noted in the reactions carried out below, the reaction apparatus was essentially the same in each case and consisted of a glass, round-bottomed flask equipped with a mechanical stirrer, gas inlet tube, distillation apparatus and a thermocouple to record temperature. The distillation apparatus was equipped to use a vacuum if needed.

EXAMPLE 1

Under an argon blanket, one hundred grams of a mixture of disilanes containing 56 weight percent dichlorotetramethyldisilane; 31.5 weight percent of trichlorotrimethyldisilane and 12.5 weight percent of tetrachlorodimethyldisilane were combined with 900 gms of dry hexane and anhydrous ammonia was bubbled through the mixture with vigorous stirring. The temperature of the mixture rose to about 58° C. over a 30 minute period at which point some reflux was observed. The reflux was continued and the ammonia was added for about one hour. The mixture slowly cooled over that period of time to about room temperature. The reaction mixture was filtered to remove the $NH_4Cl$. The hexane was removed under vacuum. The filtrate was then heated under argon, with stirring, to 275° C. for 2 hours. When cooled, the product was a hard, glassy, translucent polysilazane polymer.

EXAMPLE 2

Under an argon blanket, fifty-one and one-tenths grams of a mixture of disilanes consisting of 12 weight percent of dichlorotetramethyldisilane; 43 weight percent of trichlorotrimethyldisilane and 45 weight percent of tetrachlorodimethyldisilane were combined with 449.6 grams of dry hexane. Ammonia gas was bubbled through the solution for two hours. $NH_4Cl$ precipitated and was filtered away. The filtrate was returned to the reaction flask and treated again with ammonia gas for 2 more hours. The reaction mixture was then filtered. The filtrate was stored under argon for two days. The hexane was then removed by heating to distillation temperature. The removal of the hexane resulted in the appearance of a hazy solution due to residual $NH_4Cl$. The residue was also slightly yellow in color. The residue was heated slowly to 300° C. During the course of the heating, it was observed that the residue had turned clear yellow when the temperature reached 160° C. The residue foamed at about 200° C. and vigorous stirring and a slower heating rate was required to control the foam. The resulting residue at 300° C. was a liquid which was orange in color. When cooled, the residue was an orange-yellow, semi-solid. Infra-red analysis of the residue showed it to be an $(CH_3)_xSiN-$ containing polymer. TGA @ 1000° C. in argon gave an 11% char yield (80% weight loss). TGA conditions for this sample were: DuPont 950 TGA; 21.3564 mg sample size; platinum crucible; atmosphere was argon; flow rate was 200 cc/min.; heating rate was 10° C./min.

This polymer was subjected to pyrolysis by placing 2.4 gms of polymer in a graphite boat. The boat was placed in a tube furnace and flushed with argon for 20 minutes. The sample was then fired under argon to 1000° C. The product was shiny and black in appearance. A small sample of this shiny, black material was fired to 1600° C. under argon in a graphite crucible. This product when cooled was a dark green color. The 1000° C. sample was analyzed by X-ray analysis and showed no crystalline material. The 1600° C. sample was β-Silicon Carbide having an average crystallite size of 770 Å units.

EXAMPLE 3

Under an argon blanket, five hundred milliliters of dry pentane was added to a reaction flask equipped as indicated above. The reaction flask was cooled by means of a dry ice/acetone bath. Ammonia gas was passed through until the 2 liter, round-bottomed flask was about ½ full. One hundred grams of a mixture of disilanes having approximately the same composition as in Example 1 was mixed with 100 grams of dry pentane and this mixture was added dropwise over a 15 minute period to the ammonia/pentane. The cooling bath was then removed and the ammonia slowly boiled off as the temperature increased to room temperature. The reaction mixture was filtered and the pentane solvent was removed by vacuum and heat. The resultant polysilazane polymer residue was a colorless, cloudy viscous fluid. The yield was 45.2%.

A small portion of this material was pyrolyzed under an ammonia atmosphere to 1200° C. to yield a black and white material (two layered). The black portion was amorphous to X-rays. The white portion was amorphous to X-rays and contained a minor portion of β-$Si_3N_4$.

EXAMPLE 4

Under an argon blanket, one hundred five and two-tenths grams of a disilane mixture having the approximate composition as that in Example 1 was combined with 1.38 grams of distilled dimethylvinylchlorosilane and 1000 grams of dry toluene. The flask was flushed with dry argon and the reaction flask was cooled with a dry ice/acetone bath while ammonia gas was bubbled through the mixture for two hours. The reaction mixture was filtered and the filtrate was left under argon for about 16 hours. The toluene was distilled away from the reaction residue and the residue was heated to 275° C. for 1 hour and then cooled. Infra-red showed Si—N—Si, —NH, —NC, SiCH$_3$ and a slight amount of Si—O—Si.

EXAMPLE 5

A mixture of 45.2 weight percent tetrachlorodimethyldisilane, 42.8 weight percent of trichlorotrimethyldisilane and 12.0 weight percent of dichlorotetramethyldisilane (200.8 gms total) was combined with 1374.7 gms of dry hexane in an argon atmosphere in a flask. Ammonia was bubbled rapidly through this mixture for 1 hour. The reaction mixture was suction filtered. Ammonia gas was bubbled through the filtrate for an additional hour and the reaction mass was refiltered after standing for about 16 hours. The filtrate was slightly hazy and in this form was strip distilled to remove the hexane solvent. The remaining material was heated to 370° C. and held at that temperature for 30 minutes. The result was a milky yellow polysilazane polymer resin. Infra red analysis showed the presence of NH$_4$Cl, —Si—N—Si—, —Si(CH$_3$)$_3$, =Si(CH$_3$)$_2$ ≡SiCH$_3$ and some —Si—O—O—Si— thermogravimetric analysis gave a char yield of 30% when heated to 1000° C. in Helium, % carbon was 17.8; % H was 5.44 and % N was 4.74. A portion of this material was heated to 1200° C. in the Astro furnace to give a char yield of 29.1%. X-ray analysis of this fired material showed no crystalline phases. When another sample was heated to 1600° C., the char yield was 17.9% and X-ray analysis showed β-silicon carbide with an average crystallite size of >3000 Å units.

The resin produced in this example was tested as a ceramic binder using powdered silicon carbide as the filler. The resin, 2.3193 gms was dissolved in 10 ml. of dry hexane and then blended with 7.7388 gms of 320 mesh silicon carbide powder (U.S. Standard). The solution was then evaporated to dryness. The resulting particulate material was ball-milled for 1 hour to give it uniformity. A sample of this powder was pressed at 200° C. in an inert atmosphere. It retained its shape and gave an 86% char yield but upon firing to 1600° C., the pellet weakened and crumbled when an attempt was made to remove it from the crucible.

The resin produced in this example, 4.7923 gms, was blended into 4.8838 gms of dry toluene. Two graphite bars (9/16″ diameter×2″ in length) were coated with the solution and dried at 150° C. The bars were then fired to 1200° C. in an inert atmosphere. The coatings were pale green in color and were easily scratched. Firing to 1600° C. gave essentially the same type of easily scratchable coating.

EXAMPLE 6

A disilane mixture similar to that used in Example 5 was used herein (300 gms total). This mixture was combined with 1382.1 gms of dry hexane in a glass flask, under Argon. Ammonia gas was bubbled through the mixture for 1 hour whereupon the mixture was filtered. This bubbling of ammonia and filtration step was repeated for 1 hour. The hexane was strip distilled and residue was heated to 295° C. for 1 hour. A vacuum was applied for 4 hours. The result was a greyish colored polysilazane polymer resin. Infra red analysis showed the presence of NH$_4$Cl, —SiNHSi—, SiOSi, Si(CH$_3$)$_3$, Si(CH$_3$)$_2$ and —SiCH$_3$. TGA gave a 42% char yield to 1000° C. in Argon.

When a sample of this material was heated to 1200° C., the char yield was 35.6% of β-silicon carbide which was the main constituent. This material has an average crystallite size of >3000 Å. When heated to 1600° C., the char yield was 23.5%. The product was β-silicon carbide having an average particle size of >3000 Å.

EXAMPLE 7

Preparation of a polysilazane polymer using a chlorine-containing monomer in the presence of disilanes and ammonia.

A mixture of chlorine-containing disilanes having 44.9 weight percent of tetrachlorodimethyldisilane; 41.4 weight percent of trichlorotrimethyldisilane and 13.7 weight percent of dichlorotetramethyldisilane (400.2 gms total) was combined with 1388 gms of dry hexane in a round-bottomed glass flask under an Argon atmosphere. To this mixture was added 5.1 gms of freshly distilled vinyldimethylchlorosilane of 96.7% purity. Ammonia gas was rapidly bubbled through the system for 1 hour whereupon the mixture was filtered. The bubbling for 1 hour and filtration were repeated once. The filtrate at this point was slightly hazy. Hexane was distilled from the filtrate and the filtrate was then heated to 300° C. for 1 hour. The polysilazane polymer formed was subjected to a vacuum for 5 hours after it was cooled. The product was a yellow translucent, solid resin. Infra red analysis showed the presence of NH$_4$Cl, —SiNHSi—, —SiOSiO—, —Si(CH$_3$)$_3$, —Si(CH$_3$)$_2$ and —SiCH$_3$ moieties. A TGA gave a char yield of 35% @ 1000° C. in Argon.

Samples of this resin were fired to 1200° C. The X-ray analysis of the product showed it to be essentially amorphous.

When a sample of this resin was heated to 1600° C., the char yield was 41.8% and X-ray analysis showed the material to be essentially β-silicon carbide with an average crystallite size of greater than 3000 Å units.

That which is claimed is:

1. A process of preparing a polysilazane polymer which consists of contacting and reacting in an inert, essentially anhydrous, atmosphere, at a temperature in the range of 25° C. to 370° C.
   (A) ammonia and
   (B) chlorine-containing disilanes selected from the group consisting of
      (i) a chlorine-containing disilane having the general formula $[Cl_aR_bSi]_2$ and
   (ii) a mixture of chlorine-containing disilanes having the general formula $[Cl_cR_dSi]_2$ wherein
   a has a value of 1.5–2.0;
   b has a value of 1.0–1.5;
   the ratio of c to d is in the range of 1:1 to 2:1,
   the sum of a+b is equal to three;
   the sum of c+d is equal to three; and R in each case is selected from the group consisting of the vinyl group, alkyl radicals of 1-3 carbon atoms and the phenyl group.

2. A process as claimed in claim 1 wherein B(i) is tetrachlorodimethyldisilane.

3. A process as claimed in claim 1 wherein B(i) is trichlorotrimethyldisilane.

4. A process as claimed in claim 1 wherein B(ii) is a mixture of $(Cl_2CH_3Si)_2$, $[Cl(CH_3)_2Si]_2$ and $Cl(CH_3)_2SiSiCH_3Cl_2$.

5. A process as claimed in claim 4 wherein $(Cl_2CH_3Si)_2$, $[Cl(CH_3)_2Si]_2$ and $Cl(CH_3)_2SiSiCH_3Cl_2$ are present in a weight ratio of about 45:12:43.

6. A process as claimed in claim 1 wherein B(ii) is a mixture of $(Cl_2CH_3Si)_2$ and $[Cl(CH_3)_2Si]_2$.

7. A process as claimed in claim 6 wherein $(Cl_2CH_3Si)_2$ and $[Cl(CH_3)_2Si]_2$ are present in a weight ratio of 50:50.

8. A process as claimed in claim 6 wherein $(Cl_2CH_3Si)_2$ and $[Cl(CH_3)_2Si]_2$ are present in a weight ratio of 75:25.

9. A process as claimed in claim 1 wherein B(ii) is a mixture of $(Cl_2CH_3Si)_2$ and $Cl(CH_3)_2SiSiCH_3Cl_2$.

10. A process as claimed in claim 9 wherein $(Cl_2CH_3Si)_2$ and $Cl(CH_3)_2SiSiCH_3Cl_2$ are present in a weight ratio of 65:35.

11. The polysilazane polymer produced by the process of claim 1.

12. The polysilazane polymer produced by the process of claim 2.

13. A polysilazane polymer produced by the process of claim 3.

14. A polysilazane polymer produced by the process of claim 4.

15. A polysilazane polymer produced by the process of claim 5.

16. A polysilazane polymer produced by the process of claim 6.

17. A polysilazane polymer produced by the process of claim 7.

18. A polysilazane polymer produced by the process of claim 8.

19. A polysilazane polymer produced by the process of claim 9.

20. A polysilazane polymer produced by the process of claim 10.

21. A method of preparing a silicon carbide ceramic material which consists of heating a polysilazane polymer in an inert atmosphere or in a vacuum to at least a temperature of 750° C. until the polysilazane polymer is converted to silicon carbide ceramic material, which polysilazane polymer is obtained by a process which consists of contacting and reacting in an inert, essentially anhydrous, atmosphere, at a temperature in the range of 25° C. to 370° C.

(A) ammonia and
(B) chlorine-containing disilanes selected from the group consisting of
(i) a chlorine-containing disilane having the general formula $[Cl_aR_bSi]_2$ and (ii) a mixture of chlorine-containing disilanes having the general formula $[Cl_cR_dSi]_2$ wherein
a has a value of 1.5-2.0;
b has a value of 1.0-1.5;
the ratio of c to d is in the range of 1:1 to 2:1,
the sum of a+b is equal to three;
the sum of c+d is equal to three; and
R in each case is selected from the group consisting of the vinyl group, alkyl radicals of 1-3 carbon atoms and the phenyl group.

22. The silicon carbide ceramic material prepared by the method as claimed in claim 21.

23. A method of preparing a silicon carbide containing ceramic article which consists of (A) forming an article of the desired shape from a polysilazane polymer; (B) heating the article formed in (A) in an inert atmosphere or in a vacuum to an elevated temperature of at least 750° C. until the polysilazane polymer is converted to silicon carbide containing ceramic, which polysilazane polymer is obtained by a process which consists of contacting and reacting in an inert, essentially anhydrous, atmosphere, at a temperature in the range of 25° C. to 370° C.

(A) ammonia and
(B) chlorine-containing disilanes selected from the group consisting of
(i) a chlorine-containing disilane having the general formula $[Cl_aR_bSi]_2$ and (ii) a mixture of chlorine-containing disilanes having the general formula $[Cl_cR_dSi]_2$ wherein
a has a value of 1.5-2.0;
b has a value of 1.0-1.5;
the ratio of c to d is in the range of 1:1 to 2:1,
the sum of a+b is equal to three;
the sum of c+d is equal to three; and
R in each case is selected from the group consisting of the vinyl group, alkyl radicals of 1-3 carbon atoms and the phenyl group.

24. The article prepared by the method of claim 23.

25. The method of claim 23 wherein at least one conventional ceramic filler is mixed with the polysilazane polymer prior to forming an article of the desired shape.

26. An article prepared by the method of claim 25.

27. A method for preparing a substrate coated with a silicon carbide containing ceramic which consists of
(A) coating a substrate with polysilazane polymer which polysilazane polymer is obtained by a process which consists of contacting and reacting in an inert, essentially anhydrous, atmosphere at a temperature in the range of 25° C. to 370° C.,
(a) ammonia and
(b) chlorine-containing disilanes selected from the group consisting of
(i) a chlorine-containing disilane having the general formula $[Cl_aR_bSi]_2$ and (ii) a mixture of chlorine-containing disilanes having the general formula $$[Cl_c R_d Si]_2$$

wherein a has a value of 1.5–2.0;

b has a value of 1.0–1.5;

the ratio of c to d is in the range of 1:1 to 2:1, (B) heating the coated substrate in an inert atmosphere or in a vacuum to an elevated temperature of at least 750° C. until the coating is converted to a silicon carbide ceramic material, whereby a silicon carbide-containing ceramic coated substrate is obtained the sum of a+b is equal to three;

the sum of c+d is equal to three; and

R in each case is selected from the group consisting of the vinyl group, alkyl radicals of 1–3 carbon atoms and the phenyl group.

28. The method of claim 27 wherein at least one conventional ceramic filler is mixed with the silazane polymer prior to the coating of the substrate.

29. The coated substrate prepared by the method of claim 28.

30. A process for preparing a polysilazane polymer which consists of contacting and reacting in an inert, essentially anhydrous atmosphere at a temperature in the range of 25° C. to 370° C., (A) ammonia and (B) a mixture of chlorine-containing disilanes and monosilanes selected from the group consisting essentially of (i) a mixture of a chlorine-containing disilane and a monosilane, (ii) a mixture of a chlorine-containing disilane and a mixture of monosilanes and (iii) a mixture of chlorine-containing disilanes mixed with a mixture of monosilanes, wherein the chlorine-containing disilanes have the general formula $$(Cl_a R_b Si)_2$$

and wherein the monosilanes in each case have the general formula $$R'_n SiCl_{4-n},$$

wherein R is a vinyl group, an alkyl radical of 1–3 carbon atoms or the phenyl group; R' is vinyl, hydrogen, an alkyl group of 1–3 carbon atoms or the phenyl group; a has a value of 1.5–2.0; b has a value of 1.0–1.5; the sum of a+b is equal to three and n has a value of 0, 1, or 3.

31. A process as claimed in claim 30 wherein in (B) (iii) there is present at least 50 weight percent disilanes, based on the total weight of silanes.

* * * * *

UNITED STATES PATENT AND TRADEMARK OFFICE
CERTIFICATE OF CORRECTION

PATENT NO. : 4,395,460
DATED : July 26, 1983
INVENTOR(S) : John H. Gaul

It is certified that error appears in the above—identified patent and that said Letters Patent is hereby corrected as shown below:

In Column 1, line 29; the line reading "by a variety of methods. For example, L. W. Breed et al," should read "by a variety of methods. For example, L. W. Breed et al.,"

In Column 11, line 29; the line reading "some -Si-O-O-Si- thermogravimetric analysis" should read "some -Si-O-Si- thermogravimetric analysis"

Signed and Sealed this

Eighth Day of November 1983

[SEAL]

Attest:

Attesting Officer

GERALD J. MOSSINGHOFF

Commissioner of Patents and Trademarks